United States Patent

[11] 3,549,922

[72] Inventors Konstantin Fedorovich Kostin
prospekt Lenina, 48, kv. 101;
Grigory Iosifovich Shur, ulitsa
Krasnoflotsev, 7, kv. 11, Sverdlovsk,
U.S.S.R.
[21] Appl. No. 757,808
[22] Filed Sept. 6, 1968
[45] Patented Dec. 22, 1970

[54] VERTICAL SHAFT ELECTRIC MACHINE
1 Claim, 3 Drawing Figs.
[52] U.S. Cl..................................................... 310/157,
308/160
[51] Int. Cl..................................................... H02k 5/16,
H02k 7/08
[50] Field of Search.......................................... 310/157,
90, 91, 85, 254, 261; 308/162, 160

[56] References Cited
UNITED STATES PATENTS
1,458,121 6/1923 Brown........................... 310/157

| 2,260,814 | 10/1941 | Wood...................... | 310/157 |
| 2,466,324 | 4/1949 | Nelson..................... | 310/157 |
| 2,473,847 | 6/1949 | Baudry..................... | 310/157 |
| 2,635,198 | 4/1953 | Wieseman.................. | 310/157 |
| 2,722,612 | 1/1955 | Danel...................... | 310/157 |
| 2,767,328 | 10/1956 | Danel...................... | 310/157 |
| 3,397,332 | 4/1968 | Pinter..................... | 310/90 |

Primary Examiner—Milton O. Hirshfield
Assistant Examiner—R. Skudy
Attorney—Waters, Roditi, Schwartz & Nissen ABSTRACT: A vertical electric machine such as a hydraulic generator has at least one segmented bearing disposed above the rotor and at least one segmented bearing disposed below the rotor on supports. Each bearing is provided with a hydraulic system intercommunicating the segments thereof. The hydraulic systems of the bearings disposed above and below the rotor are interconnected hydraulically by a pipeline to allow partial movement of the fluid from one system to the other to vary the distribution of the load between the bearings.

VERTICAL SHAFT ELECTRIC MACHINE

The present invention relates to electric machines whose rotor has a vertical shaft, and mainly to powerful water-wheel generators in which the turbine impeller is subjected to large axial loads created by the weight of the rotating parts of the set and by the axial hydraulic force.

Until recently, two types of electric machines with a vertical rotor shaft have been used, namely, suspended and umbrella types.

The term "suspended-type electric machines" (for example, water-wheel generators) is used to describe a design in which the thrust bearing of, say, segmental type, is located above the rotor. This bearing is supported by the upper load-carrying spider which transmits axial load to the stator. The lower spider takes the load of the guiding bearing.

The term "umbrella-type electric machines" denotes a design in which the thrust bearing, also of segmental type, is located under the rotor. In this case the bearing is supported either by the lower load-carrying spider transmitting the load to the foundation, or by the oil bath resting on the turbine.

The suspended-type water-wheel generator affords greater access to the thrust bearing, whose location ensures higher mechanical stability of the generator. Wide employment of the suspended water-wheel generators is determined in the first place by the stator diameter and the load on the thrust bearing which, in turn, determine the weight and size of the supporting spider and the possibilities of its manufacture and transportation by rail. However, the suspended water-wheel generator compared with the umbrella type, all other conditions being equal, is greater in height. The medium-speed and high-speed suspended water-wheel generators are very long and have a relatively small stator diameter.

Powerful low-speed suspended-type water-wheel generators with large-diameter stators whose thrust bearings carry heavy loads, are fitted with a very bulky upper load-carrying spider. Therefore, it is practicable in such cases to use umbrella-type water-wheel generators.

The greatest difficulties in designing a water-wheel generator are encountered when the thrust bearing of a powerful generator must resist high axial loads. These difficulties occur both at low rotation speeds owing to the small thickness of the oil film between the rubbing parts of the thrust bearing, and at high rotation speeds owing to a large heat release in the thrust bearing.

The attempts to eliminate the aforesaid disadvantages have led to the advent of multistage thrust bearings provided with devices equalizing the load on the segments and bearing stages.

However, the use of a multistage thrust bearing at high loads in the suspended and umbrella types of water-wheel generators eliminates certain disadvantages but introduces other disadvantages. In the suspended-type generators, the generator height and the weight of the upper spider are considerably increased. In the umbrella-type machines the access to the thrust bearing is impaired while in some cases it becomes necessary to increase the distance between the generator and turbine to accommodate several stages of the thrust bearing, which fact also increases the height of the whole turbine-generator set.

An object of the present invention is to decrease the overall dimensions and weight of the electric machine, to reduce the losses due to friction, and to increase the reliability of the supporting devices as compared to water-wheel generators, incorporating single-stage thrust bearings.

These and other objects are achieved by providing an electric machine with at least two segmental thrust bearings installed on the vertical shaft of the rotor, and resisting axial loads and mounted on supports, in which said thrust bearings, according to the invention, are located above and beneath the rotor.

In order to equalize or redistribute the load between the thrust bearings in operation, it is practicable to provide each of them with a hydraulic system for equalizing the load on the segments. The hydraulic systems of the upper and lower systems must communicate with each other.

The use of the present invention ensures uniform distribution of the axial load between the bearing supports. The height and weight of the upper spider can be reduced as compared to the suspended-type electric machine because said spider takes only a part of the axial load. The lower spider having shorter lugs and designed to take the radial forces of the rotating parts of the turbine-generator set can, without substantial reinforcement, resist its share of the axial load of the thrust bearing.

All these factors ensure a reduction in the weight and height of the electric machine which is especially important for its installation in underground hydroelectric power stations.

Now the invention will be described by way of example with reference to the accompanying drawings in which.

Figure 1:
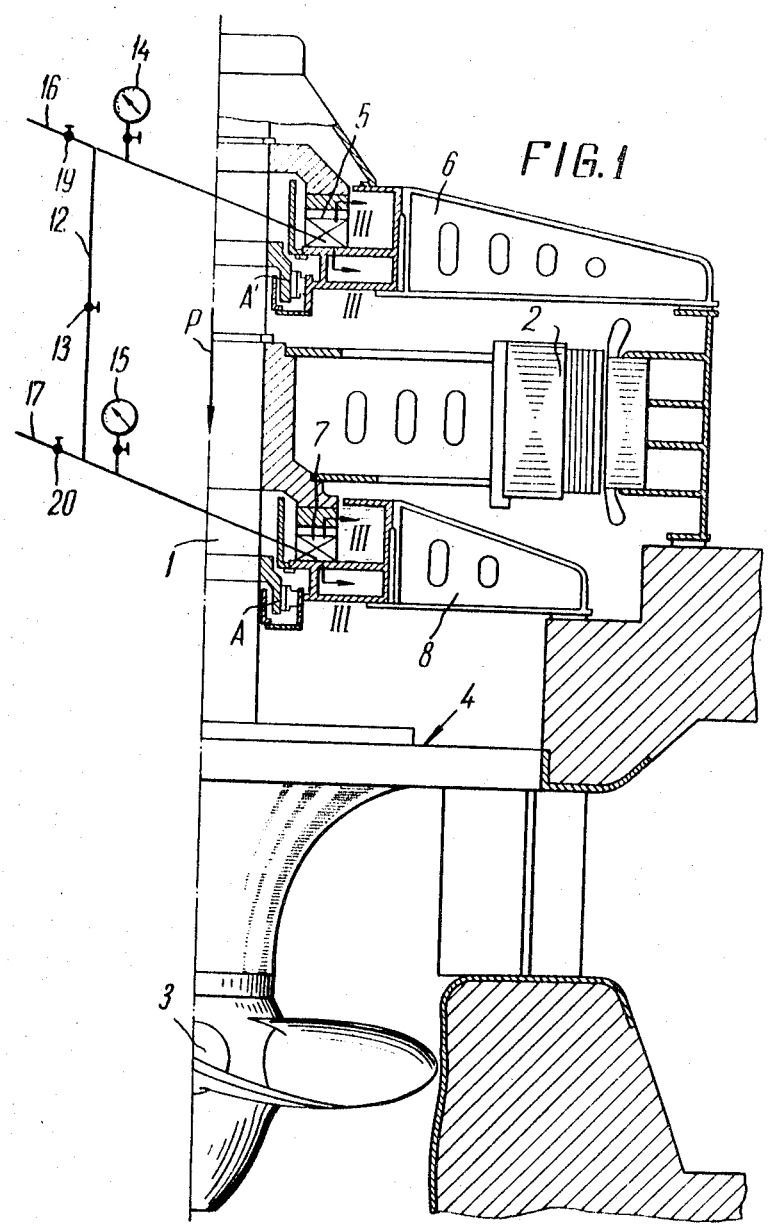
FIG. 1 is a sectional view of an electrical machine in which the thrust bearing located above the rotor is installed in the upper spider while the thrust bearing located under the rotor is installed in the lower spider; also the turbine with impeller.
Figure 3:
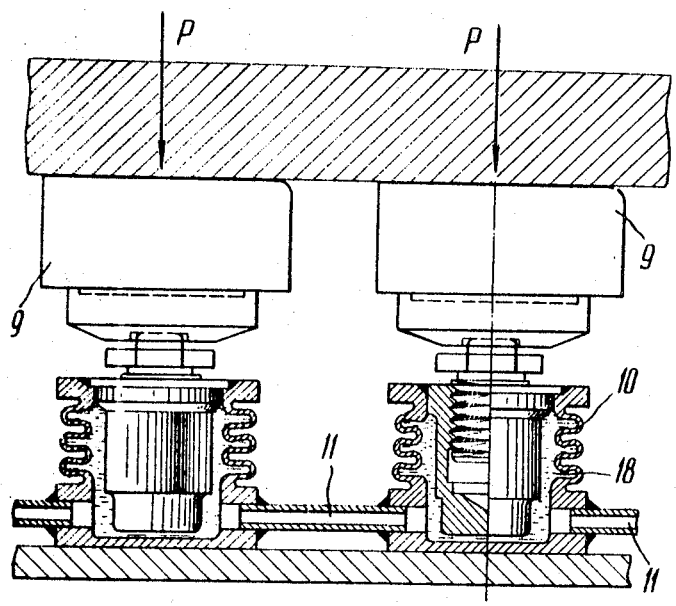
FIG. 3 is a sectional view taken along lines III–III in FIGS. 1 and 2 showing two segments of the thrust bearings and part of the hydraulic system.

Rigidly secured on the vertical shaft 1 (FIG. 1) of an electric machine is a rotor 2. The radial forces originated by the rotation of the rotor 2 and acting on the shaft 1 are resisted by guiding bearings A and A'. The load P produced by the weight of the rotor 2, wheel 3 of a turbine 4 and the axial hydraulic force on the turbine wheel 3, acting along the axis of the shaft 1 is resisted by a thrust bearing 5 connected with the shaft 1 and located above the rotor 2 in an upper spider 6, and by a thrust bearing 7, likewise connected with the shaft 1 but located under the rotor 2 in a lower spider 8. The thrust bearings 5 and 7 are of segmental type. Each of said bearings 5 and 7 has a hydraulic system for distributing the applied load between the segments 9 (FIG. 3), said system comprising bellows 10 intercommunicating through pipe connections 11. The hydraulic systems of the upper and lower bearings 5 and 7 (FIG. 1) intercommunicate through a pipe 12. To distribute the load P between the spiders 6 and 8 in the desired proportions there is a control system connected to the pipe 12, said system comprising a valve 13 for disconnecting the hydraulic systems of the upper and lower bearings 5 and 7, pressure gauges 14 and 15, pipe connections 16 and 17 for delivering and draining the working fluid 18 (FIG. 3), valves 19 and 20 (FIG. 1) for making the hydraulic systems pressure-tight.

Figure 2:
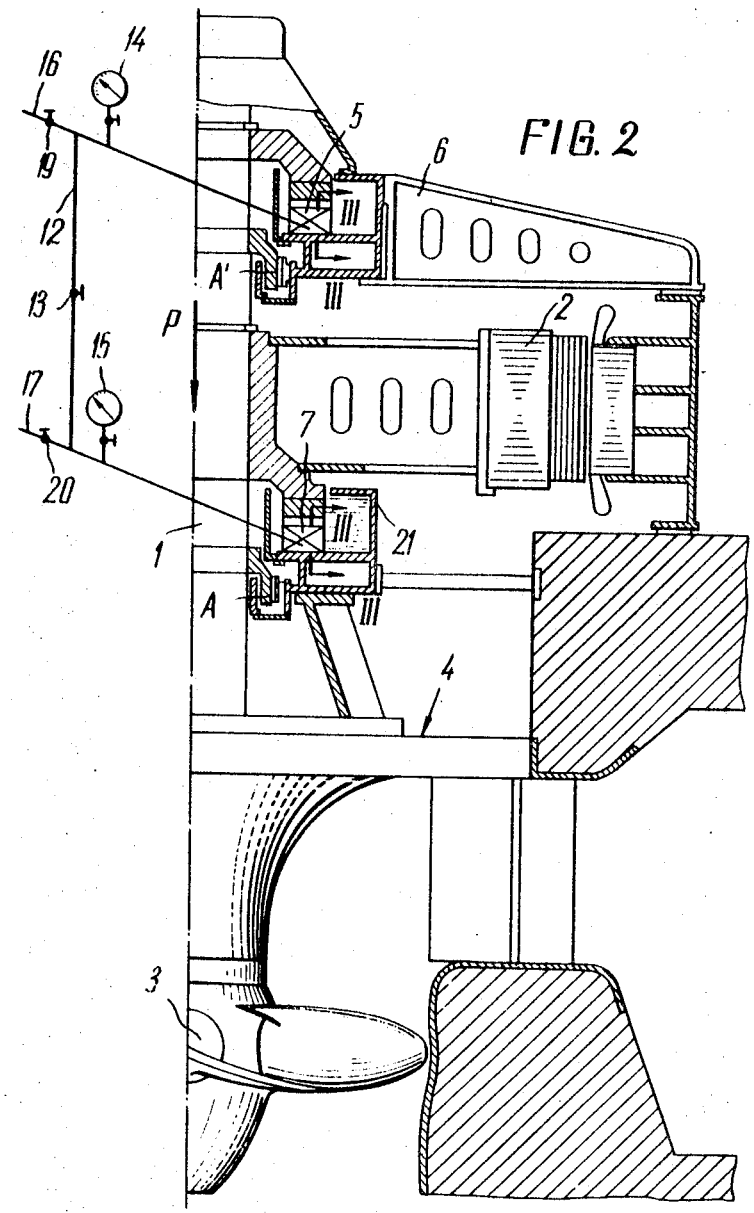
FIG. 2 is a sectional view of an electrical machine in which the thrust bearing located above the rotor is installed in the upper spider whereas the thrust bearing located under the rotor is installed in the oil bath resting on the turbine.

Another embodiment of the electric machine shown in FIG. 2 is similar to the one described above, differing from it in that the lower load-carrying spider is absent and the thrust bearing 7 located under the rotor 2 is supported by an oil bath 21 which transmits the axial load to the turbine 4.

When the hydraulic systems of the identical thrust bearings 5 and 7 intercommunicate through the pipe 12, the load P is equally divided between the spiders 6 and 8 and, as distinct from, say, the suspended-type electric machines, the upper spider 6 will carry only one-half of the load, therefore its height and weight will be reduced while the height and weight of the lower spider 8 will increase but slightly.

The presence of the bearings 5 and 7 installed below and above the rotor and interconnection of their hydraulic load-distribution systems by a control system make it possible to redistribute the load on the spiders 6 and 8 until one of them is completely relieved. For instance, by closing the valve 13 on the pipe 12 and by draining or feeding in the fluid 18 through the pipe connections 16 and 17 it becomes possible to increase or reduce the load on the corresponding spider, as required.

A specific embodiment of the invention is disclosed in the above description. However, other versions of the invention are also possible, for example, the employment of mechanical systems for the distribution of loads, within the scope of the invention.

We claim:
1. A vertical electrical machine comprising: a vertical shaft; a rotor mounted on said shaft; two supports, disposed one above the rotor, the other below said rotor; at least two segmented thrust bearings connected to said shaft, of which at least one is disposed above said rotor and at least one below said rotor, said bearings being mounted on said supports; each said bearing including hydraulic systems for redistributing the load between the segments of said segmented bearings, and means including a pipe interconnecting said hydraulic systems of said bearings for regulating hydraulic flow between said systems of said bearings for varying the distribution of load between said bearings.